(12) United States Patent
Baehr-Jones et al.

(10) Patent No.: US 7,760,970 B2
(45) Date of Patent: Jul. 20, 2010

(54) SINGLE PHOTON ABSORPTION ALL-OPTICAL MODULATOR IN SILICON

(75) Inventors: Tom Baehr-Jones, Seattle, WA (US); Michael J. Hochberg, Seattle, WA (US); Axel Scherer, Laguna Beach, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 12/251,032

(22) Filed: Oct. 14, 2008

(65) Prior Publication Data

US 2009/0123108 A1 May 14, 2009

Related U.S. Application Data

(60) Provisional application No. 60/998,490, filed on Oct. 11, 2007.

(51) Int. Cl.
*G02F 1/035* (2006.01)

(52) U.S. Cl. .................. 385/2; 385/10; 385/4; 385/8
(58) Field of Classification Search .............. 385/2, 385/4, 8, 10
See application file for complete search history.

(56) References Cited

U.S. PATENT DOCUMENTS

2008/0008416 A1 * 1/2008 Prosyk et al. .............. 385/20

* cited by examiner

*Primary Examiner*—Ellen Kim
(74) *Attorney, Agent, or Firm*—Milstein Zhang & Wu LLC; Joseph B. Milstein (57) ABSTRACT

A single-photon absorption all-optical modulator, systems employing the same, and methods of making and using the same. An illustrative example is provided based on silicon semiconductor technology that employs rectangular waveguides. In some embodiments, it is observed that the waveguides operate with an absorption density of less than $10^{17}$ cm$^{-1}$s$^{-1}$mW$^{-1}$ to provide a single-photon absorption operation mode.

11 Claims, 7 Drawing Sheets

FIG. 7

SINGLE PHOTON ABSORPTION ALL-OPTICAL MODULATOR IN SILICON

CROSS-REFERENCE TO RELATED APPLICATIONS

This application claims priority to and the benefit of U.S. provisional patent application Ser. No. 60/998,490, filed Oct. 11, 2007, which application is incorporated herein by reference in its entirety.

STATEMENT REGARDING FEDERALLY FUNDED RESEARCH OR DEVELOPMENT

The U.S. Government has certain rights in this invention pursuant to Grant No. HR0011-04-1-0054 awarded by DARPA.

FIELD OF THE INVENTION

The invention relates to all-optical modulators in general and particularly to a silicon all-optical modulator that employs single photon absorption.

BACKGROUND OF THE INVENTION

All-optical, low-power modulation is a major goal in photonics. Because of their high mode-field concentration and ease of manufacturing, nanoscale silicon waveguides offer an intriguing platform for photonics. To the best knowledge and belief of the inventors, all-optical modulators built with silicon photonic circuits have relied on either two-photon absorption (TPA) or the Kerr effect. Both effects are weak in silicon, and require extremely high (~5 W) peak optical power levels to achieve modulation.

Almeida et al ("All-optical control of light on a silicon chip," *Nature*, vol. 431, pp. 1081-1084, 2004.) and Foerst et al ("High-speed all-optical switching in ion-implanted silicon-on-insulator microring resonators," *Optics Letters*, vol. 32, pp. 2046-2048, 2007) have recently demonstrated an all-optical modulator with single-photon absorption-based carrier injection using visible light. This approach has severe limitations. Because of the disparate wavelengths for gate and signal, these devices cannot be cascaded into circuits that require feedback.

There is a need for an all-optical modulator that uses the same wavelength of light to control the device as is used to carry signals representing information through the device.

SUMMARY OF THE INVENTION

In one aspect, the invention relates to an optical modulator configured to operate in a single-photon absorption mode. The optical modulator comprises a ridge waveguide having an input port, an output port and a gate port, the ridge waveguide having an absorption density of less than $10^{17}$ $cm^{-1}s^{-1}mW^{-1}$, the ridge waveguide configured to operate in a single-photon absorption mode; the input port of the ridge waveguide configured to receive an input optical signal to be modulated; the gate port of the ridge waveguide configured to receive a gate signal representing a desired modulation to be applied to the input optical signal; and the output port of the ridge waveguide configured to provide as output an output signal representing the input signal modulated using the gate signal.

In some embodiments, the ridge waveguide has an absorption density of less than $10^{16}$ $cm^{-1}s^{-1}mW^{-1}$. In some embodiments, the ridge waveguide has an absorption density of less than $10^{15}$ $cm^{-1}s^{-1}mW^{-1}$. In one embodiment, the ridge waveguide comprises a Mach-Zehnder interferometer. In one embodiment, the ridge waveguide comprises a semiconductor material. In one embodiment, the semiconductor material is silicon. In one embodiment, there is provided a logical element. The optical logic element comprises an optical modulator as describe above; an optical source configured to provide an input optical signal to the input port of the ridge waveguide; an optical source configured to provide at the gate port of the ridge waveguide a gate signal representing a desired modulation to be applied to the input optical signal; and a detector configured to detect an output signal provided as output at the output port of the ridge waveguide. The logic element is configured to implement a logic function based on a state of the input optical signal and a state of the gate signal, the logic function represented by a state of the output signal relative to the state of the input signal.

In another aspect, the invention features an optical modulator configured to operate in a single-photon absorption mode. The optical modulator comprises a ridge waveguide having an input port, an output port and a gate port, the ridge waveguide having a surface to volume ratio of at least 18 $\mu m^{-1}$ computed using a unit length of 1 μm of the waveguide, with the width and depth dimensions of the waveguide being measured in units of microns, the ridge waveguide configured to operate in a single-photon absorption mode; the input port of the ridge waveguide configured to receive an input optical signal to be modulated; the gate port of the ridge waveguide configured to receive a gate signal representing a desired modulation to be applied to the input optical signal; and the output port of the ridge waveguide configured to provide as output an output signal representing the input signal modulated using the gate signal.

In one embodiment, the ridge waveguide comprises a Mach-Zehnder interferometer. In one embodiment, the ridge waveguide comprises a semiconductor material. In one embodiment, the semiconductor material is silicon. In one embodiment, the invention provides an optical logic element. The optical logic element comprises n optical modulator as describe above, an optical source configured to provide an input optical signal to the input port of the ridge waveguide; an optical source configured to provide at the gate port of the ridge waveguide a gate signal representing a desired modulation to be applied to the input optical signal; and a detector configured to detect an output signal provided as output at the output port of the ridge waveguide. The logic element is configured to implement a logic function based on a state of the input optical signal and a state of the gate signal, the logic function represented by a state of the output signal relative to the state of the input signal.

In yet another aspect, the invention relates to a method of operating an optical modulator in a single-photon absorption mode. The method comprises the steps of: providing a ridge waveguide having an input port, an output port and a gate port, the ridge waveguide having an absorption density of less than $10^{17}$ $cm^{-1}s^{-1}mW^{-1}$, the ridge waveguide configured to operate in a single-photon absorption mode, in which the input port of the ridge waveguide configured to receive an input optical signal to be modulated, in which the gate port of the ridge waveguide configured to receive a gate signal representing a desired modulation to be applied to the input optical signal, and in which the output port of the ridge waveguide configured to provide as output an output signal representing the input signal modulated using the gate signal; applying to the input port of the ridge waveguide an input optical signal; applying to the gate port of the ridge waveguide a gate signal representing a desired modulation to be applied to the input optical signal; and detecting at the output port of the ridge waveguide an output signal representing the input signal modulated using the gate signal. The input signal is modulated by the optical modulator.

In one embodiment, the ridge waveguide comprises a Mach-Zehnder interferometer. In one embodiment, the ridge waveguide comprises a semiconductor material. In one embodiment, the semiconductor material is silicon.

In still another aspect, the invention features a method of operating an optical modulator in a single-photon absorption mode. The method comprises the steps of: providing a ridge waveguide having an input port, an output port and a gate port, the ridge waveguide having a surface to volume ratio of at least 18 $\mu m^{-1}$, computed using a unit length of 1 $\mu m$ of the waveguide, with the width and depth dimensions of the waveguide being measured in units of microns, the ridge waveguide configured to operate in a single-photon absorption mode, in which the input port of the ridge waveguide configured to receive an input optical signal to be modulated in which the gate port of the ridge waveguide configured to receive a gate signal representing a desired modulation to be applied to the input optical signal, and in which the output port of the ridge waveguide configured to provide as output an output signal representing the input signal modulated using the gate signal; applying to the input port of the ridge waveguide an input optical signal; applying to the gate port of the ridge waveguide a gate signal representing a desired modulation to be applied to the input optical signal; and detecting at the output port of the ridge waveguide an output signal representing the input signal modulated using the gate signal. The input signal is modulated by the optical modulator.

In one embodiment, the ridge waveguide comprises a Mach-Zehnder interferometer. In one embodiment, the ridge waveguide comprises a semiconductor material. In one embodiment, the semiconductor material is silicon.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Because silicon has a bandgap of 1.12 eV, it is an ideal material platform for near-infrared integrated optical circuits. Electrically driven modulation and an optically pumped silicon laser have been previously demonstrated. For all-optical signal processing applications, low-power all-optical modulation is very useful and would represent an appreciable advance. Applications that are contemplated include optical buffering, all-optical wavelength conversion, and all-optical computation. Silicon is also a useful material because of its low cost as compared to many other semiconductors, and because it has a very well developed and well understood processing technology. Nevertheless, other semiconductor materials might in principle be used instead of silicon in a single-photon absorption device. For some optical wavelengths, other materials might be advantageous as compared to silicon.

We describe an all-optical Mach-Zehnder modulator based on a single-photon absorption (SPA) process, fabricated entirely in silicon. Our single-photon absorption modulator is based on a process by which a single photon at 1.55 $\mu m$ is absorbed and an apparently free-carrier mediated process causes an index shift in silicon, even though the photon energy does not exceed that of silicon's bandgap. We demonstrate all-optical modulation with a gate response of 1 degree/mW at 0.5 GBit/s. This is over an order of magnitude more responsive than typical previously demonstrated devices. Even without resonant enhancement, further engineering may enable all optical modulation with less than 10 mW of gate power required for complete extinction, and speeds of 5 GBit/s or higher.

We have demonstrated all-optical modulation in silicon with a novel single photon mechanism. Our device achieves modulation at power levels an order of magnitude lower than typical all-optical modulators in silicon. We believe that bandwidths in the tens of gigahertz and peak modulation powers on the scale of 10 mW are achievable. With such performance, it will be possible to obtain broadband all-optical signal gain, enabling chip-scale optical transistors to be integrated into all-optical integrated logic circuits.

Geis et al. ("CMOS-Compatible All-Si High-Speed Waveguide Photodiodes With High Responsivity in Near-Infrared Communication Band," *IEEE Photonics Technology Letters*, vol. 19, pp. 152-154, 2007) demonstrated an efficient photodetector at 1.55 $\mu m$ based on an single-photon absorption mechanism, achieving greater than 50% quantum efficiency at speeds up to 10 GHz. This photodetector utilized absorption centers created in a waveguide by ion damage (e.g., implanting silicon with silicon ions), which enabled absorption of photons at energies below the bandgap, which absorption appears to be correlated with the defects in the volume of the semiconductor. Single photon absorption was also observed in undamaged samples, and attributed to surface-state absorption. Similar linear photocurrent responses have been observed by others, both due to volume defects and due solely the waveguide surface states, for example in J. D. B. Bradley, et al., "Silicon waveguide-integrated optical power monitor with enhanced sensitivity at 1550 nm,"

Applied Physics Letters, vol. 86, art. no. 241103, 2005, in Y. Liu et al., "In-line channel power monitor based on helium ion implantation in silicon-on-insulator waveguides," IEEE Photonics Technology Letters, vol. 18, pp. 1882-1884, 2006, and in T. Baehr-Jones, M. Hochberg, and A. Scherer, "Photodetection in silicon beyond the band edge with surface states," Optics Express, vol. 16, pp. 1659-1668, 2008. It has been hypothesized that defects create mid-bandgap states, enabling an electron to reach the conduction band from the valence band, but the precise mechanism is not yet fully understood. These investigations did not deal with modulation effects, but rather simply with photodetection.

It is well known that surface states cause optical loss in silicon waveguides. Most low-loss geometries involve large silicon waveguides, on the scale of 0.450 μm×0.250 μm and 2 μm×0.9 μm, which minimize the interaction of the optical mode with surface states. In our single-photon absorption modulator, we use a smaller 0.5×0.1 μm ridge waveguide resulting in a very large electric field at the etched surfaces. The fabrication of ridge waveguides in silicon, such as the 0.5×0.1 μm ridge waveguide, has previously been described in several of our previous patent documents, including U.S. Pat. Nos. 7,200,308 and 7,424,192, and in published application US2007/0035800 A1, all of which are incorporated by reference herein in their entirety. By electrically contacting the silicon waveguides, we have demonstrated that a linear photocurrent can be observed, with a quantum efficiency of 2.8%. We have identified that the region responsible for the photocurrent was the waveguide surface, though the precise mechanism was not determined.

Device Layout and Test

Layout

We use the surface-absorption process to build an all-optical modulator. We introduce a gate optical mode into one arm of a Mach-Zehnder interferometer. The single-photon absorption process occurs, and an unbalanced refractive index shift occurs in one of the arms, causing constructive or destructive interference in a signal beam that is provided to the input port of the Mach-Zehnder interferometer, with the output observed at an output port of the Mach-Zehnder interferometer.

Figure 1:
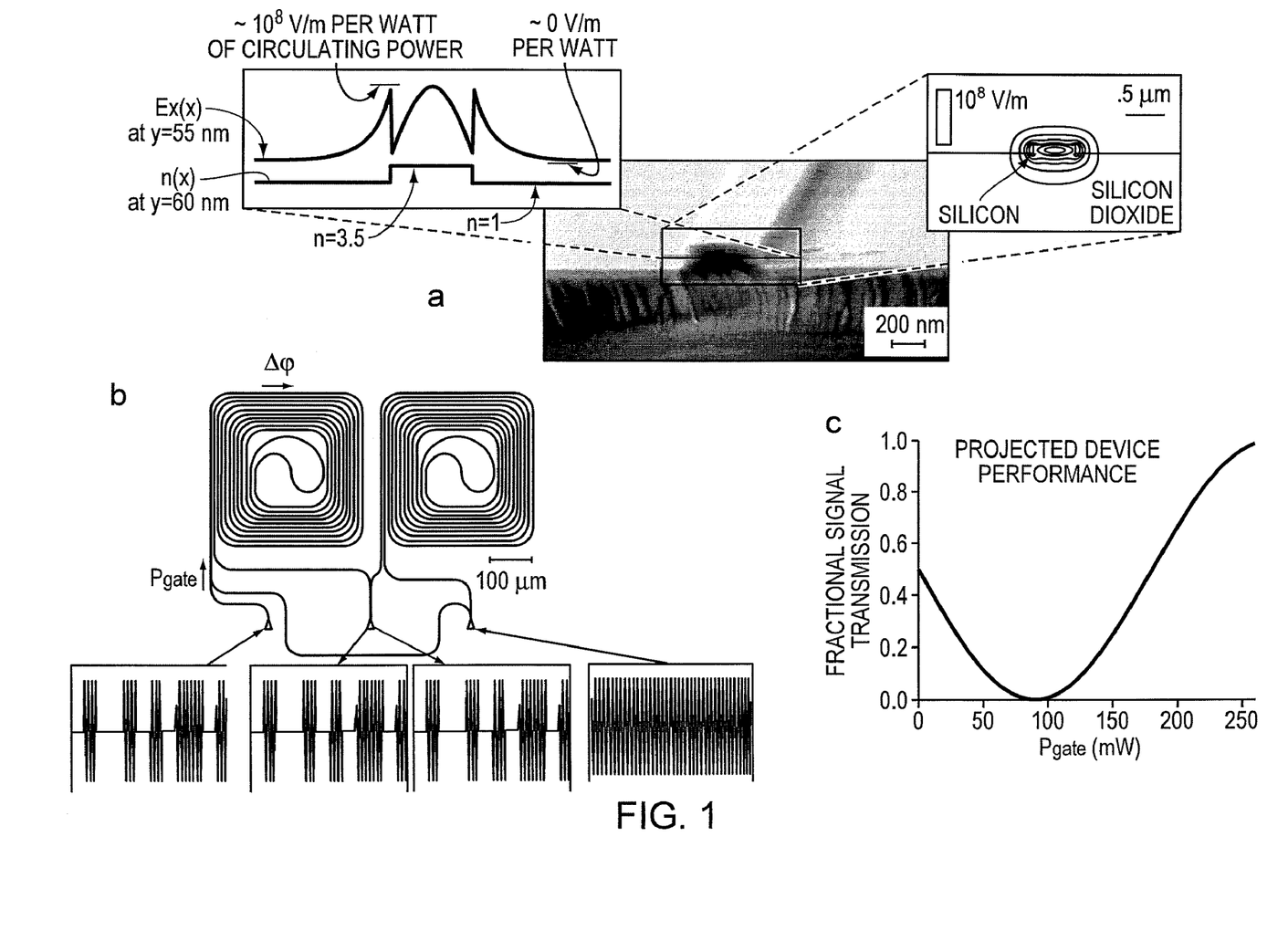
FIG. 1 illustrates an exemplary embodiment a waveguide that is useful to provide single photon absorption modulator device layout, with some of the properties of the modulator, according to principles of the invention.
Figure 2:
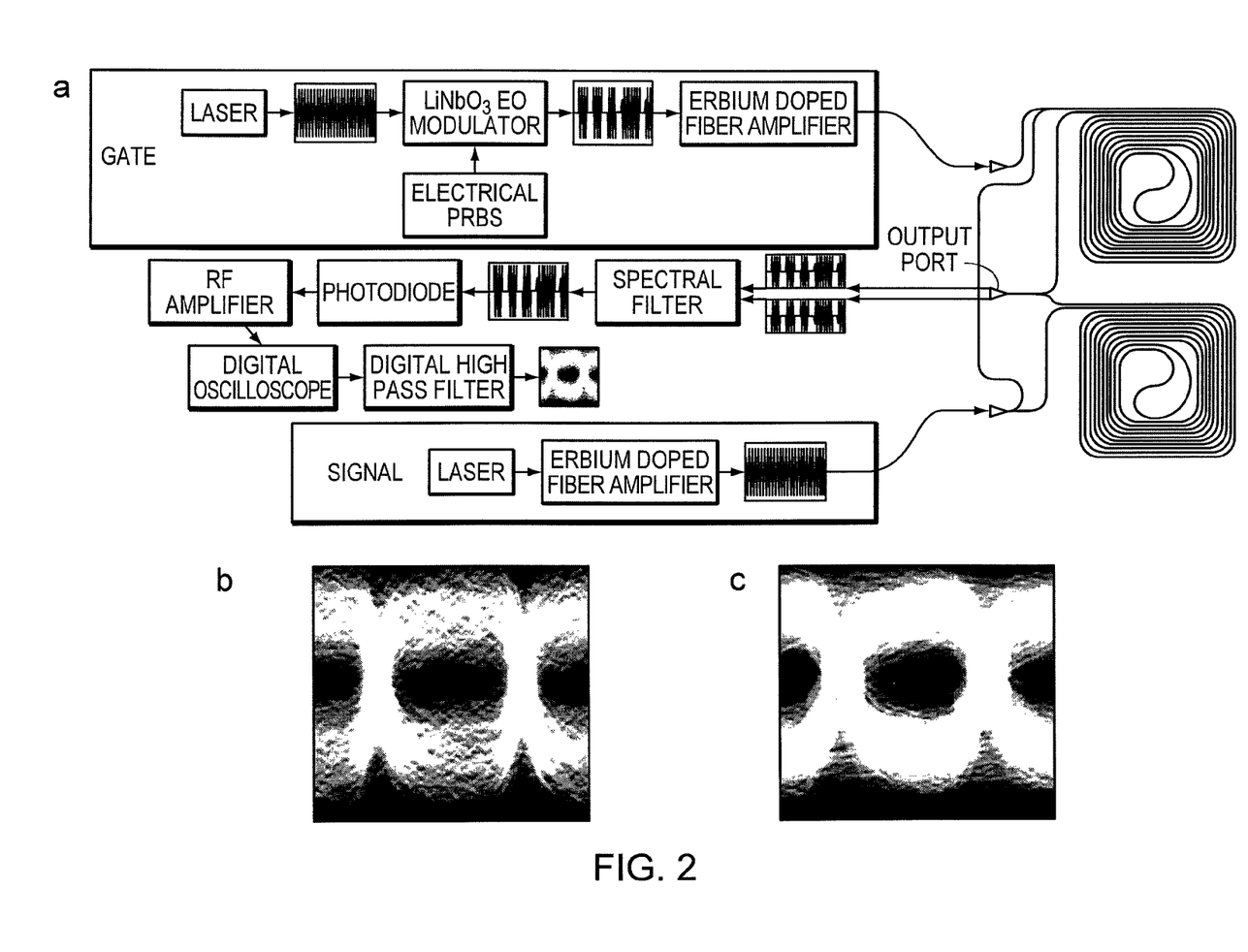
FIG. 2 is a diagram showing an illustrative experimental setup used to measure the response of the single photon absorption modulator, and showing eye-patterns observed, according to principles of the invention.

FIG. 1(a) is diagram showing a SEM micrograph of cleaved ridge waveguide with modal patterns illustrated to the left and with calculated electrical field contours shown to the right. FIG. 1(b) is a diagram showing an optical image of the single-photon absorption modulator, with the gate and signal optical modes illustrated. $P_{gate}$ indicates the location that the gate optical mode is mixed into a Mach-Zehnder arm with a y-junction, and begins to cause a phase delay, labeled $\Delta\phi$, in the signal mode. The input port to the Mach-Zehnder is indicated by the port on the lower right of the figure having an arrow pointing thereto, indicating that the input signal is applied to that port. The output port of the Mach-Zehnder is the port in the bottom middle of the figure having two arrows pointing away therefrom, indicating that the output signal is provided at that port. The output port of the Mach-Zehnder is so labeled explicitly in FIG. 2(a). The gate power as reported in the paper is always the propagating power at this point in the waveguide. Thought not visible in this image, there is a corresponding y-junction on the opposing arm, ensuring that the Mach-Zehnder is balanced. FIG. 1(c) is a diagram showing the idealized transmission of the signal is shown, for a device with a gate response of 1 degree/mW, and a bias point of 90 degrees.

Referring to FIG. 1, showing the device geometry, the arm lengths of the devices that we tested ranged from 0.75 to 1.25 cm, and the arms were unequal in length within each device, with differences ranging from 150 μm to 600 μm. This length inequality allows us to control the intrinsic phase shift between the arms by tuning the signal wavelength. Typical waveguide losses in these devices were 6 dB/cm. Input coupling is achieved from a polarization-maintaining fiber array via grating couplers.

The device performance is best characterized by the phase shift induced per unit gate power. A gate response of 1 degree/ mW corresponds to around 180 mW for complete extinction of the signal mode, if the gate response remains linear at higher powers. The power level required to obtain extinction of the signal, which we call Pπ, is analogous to the Vπ associated with an electrooptic modulator.

Fabrication Information

Devices were fabricated in electronics-grade silicon-on-insulator (SOI) wafers supplied by Soitec (Soitec USA Inc., 2 Centennial Drive, Peabody, Mass. 01960, http://www.soitec-.com/en/index.php), doped at around $10^{15}$ dopant atoms (Boron)/cm$^3$. No implant or irradiation was performed on the silicon material. The starting silicon material was thinned to about 110 nm by dry oxidation, separated into small chips, and patterned with electron-beam lithography using a 100-kV electron-beam writer using hydrogen silsesquioxane (HSQ) resist. The samples were etched with chlorine in an inductively coupled plasma etcher. No cladding layer was deposited. The SOI wafer serves as a substrate for the fabricated devices.

Testing with Pseudo-Random Bit Sequence

Initial testing was done by modulating the gate beam with a pseudo-random bit sequence. A modulated gate optical mode on the order of 25 mW propagating power in the waveguide with 50% extinction was used, and this was directed into the gate port of the modulator. To assist the measurements and enhance the effect by increasing the optical power levels, two Erbium Doped Fiber Amplifiers (EDFA) were used. The signal beam was set to a wavelength such that there was an intrinsic 90 degree modulator bias point. We obtained eye diagrams at 300 and 500 MBit/sec, as shown in FIG. 2.

FIG. 2(a) is a diagram showing an illustrative experimental setup used to measure the response of the single-photon absorption modulator, and used to obtain an eye-pattern. FIG. 2(b) is a diagram showing an eye-pattern obtained at 300 MBit/sec. FIG. 2(c) is a diagram showing an eye-pattern obtained at 500 MBit/sec.

As shown in FIG. 2(a), the gate is supplied with a signal generated using a laser source feeding a signal to an electro-optical modulator, such as a lithium niobate (LiNbO$_3$) electro-optical modulator that is driven by an electrical pseudo-random binary sequence (PRBS) generator. The signal from the electro-optical modulator is amplified by an EDFA, and applied to the gate port. The input signal applied to the input port of the Mach-Zehnder is generated using a laser signal that is amplified by an EDFA. The output from the Mach-Zehnder is observed after being passed through a spectral filter, and detected with a photodiode that provides an electrical signal representative of the output of the Mach-Zehnder. The electrical signal is amplified with an RF amplifier, and provided to the input of a digital oscilloscope. The signal is processed with a digital high pass filter and displayed to a user or recorded as may be desired.

It is important to note in FIG. 2 that the spectral filter placed in the modulator output preferentially removes the original gate optical frequency, leaving only the signal frequency. As a result, the open eye pattern demonstrates that the bit pattern on the gate mode has been transferred via the all-optical modulator to the signal mode. This type of operation is likely to be of use in the construction of future all-optical networks.

Characterization with Sinusoidal Excitation

Figure 3:
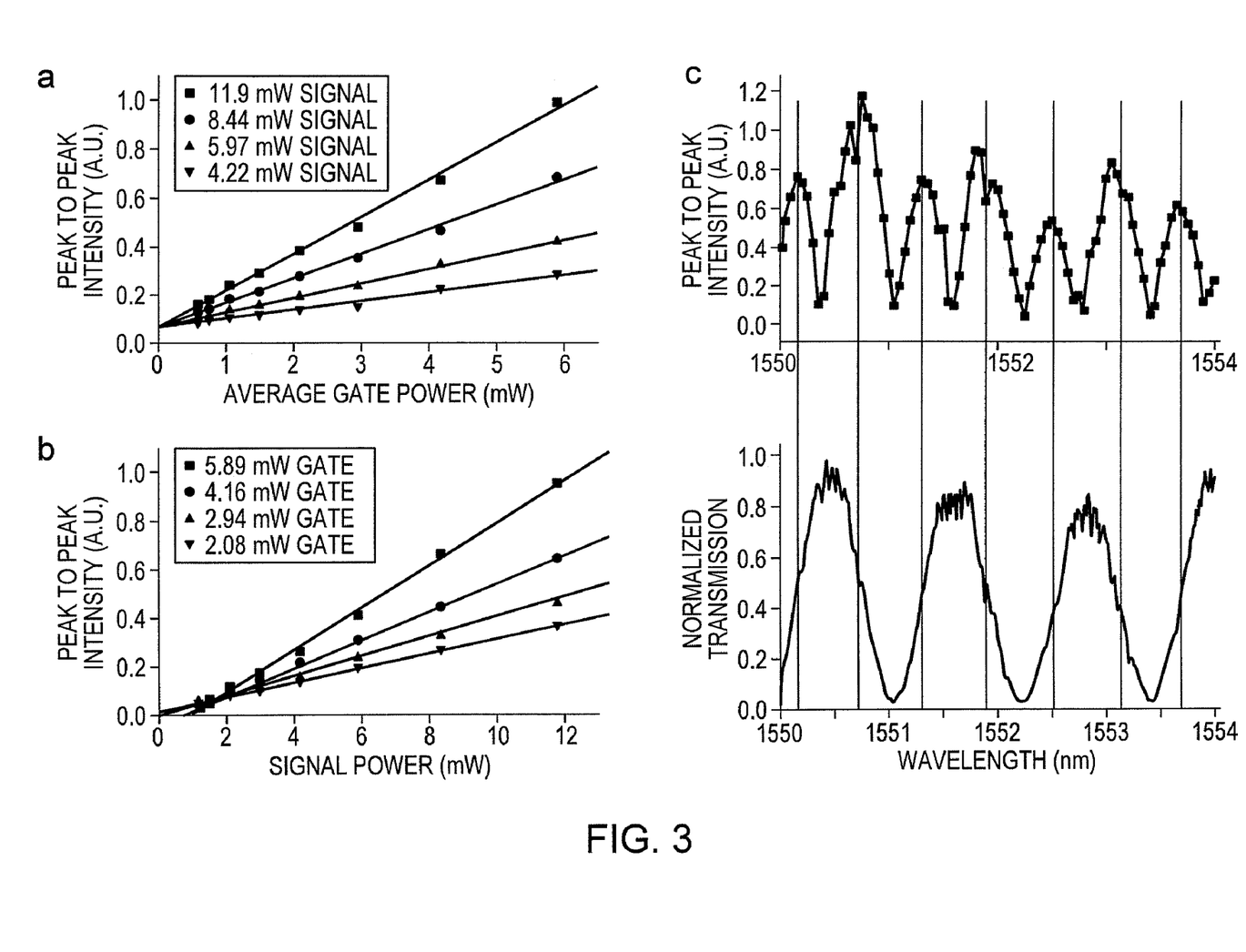
FIG. 3 is a diagram showing the results of lock-in amplifier assisted measurements, according to principles of the invention.

To better understand the device response with lower gate powers, and to characterize the frequency dependence of the mechanism, testing was performed with a gate having a sinusoidal intensity modulation. A lock-in amplifier was also used. FIG. 3 shows typical results. In the measurements described, an single-photon absorption modulator achieved a response to the gate of 0.6 degree/mW. We used a frequency of 32 MHz, a gate wavelength of 1541 nm, and a signal wavelength of 1550.8 nm to test single-photon absorption modulators with varying arm lengths, frequencies and wavelengths. The extinction on the sinusoidal modulation was around 20%.

We measured the dependence of the device response on the signal wavelength. As shown in FIG. 3, the maximum response occurred at bias points of 90 or −90 degrees. These bias points represent the locations of the maximum response for a phase-modulation-based effect. This is compelling evidence that the single-photon absorption mechanism primarily causes phase modulation, not intensity modulation. Changing the gate wavelength did not lead to a notable change in device performance. This response is as expected, since at no point does the gate mode interfere with itself, nor should the phase of the gate mode affect the signal mode.

FIG. 3 is a diagram showing the results of lock-in amplifier assisted measurements. FIG. 3(a) is a graph showing the device response, in peak to peak intensity of modulated signal, as a function of gate power. The extinction on the gate is about 20%. The signal power reported is the projected average power in the silicon waveguide just before the initial Mach-Zehnder y-junction. FIG. 3(b) is a graph showing the device response in similar circumstances as a function of varying signal power. In both cases, a linear relation is observed. FIG. 3(c) is a graph showing the device response as a function of signal wavelength, as well as the passive transmission through the single-photon absorption modulator of the signal alone. Maximum response is found at 90 and 270 degree bias points, which have 50% signal mode transmission, corresponding to a phase modulation mechanism.

The data shown in FIG. 3 also provide insight into the quantum mechanism behind the all-optical modulation. In particular, a single photon mechanism is suggested. If the modulation were based on a two-photon process, then the increase in peak-to-peak output intensity should be quadratic in increasing gate powers. Note that as in the pseudo-random bit sequence experiments, a filter has been used to selectively view only the signal optical mode.

Frequency Dependence

Figure 4:
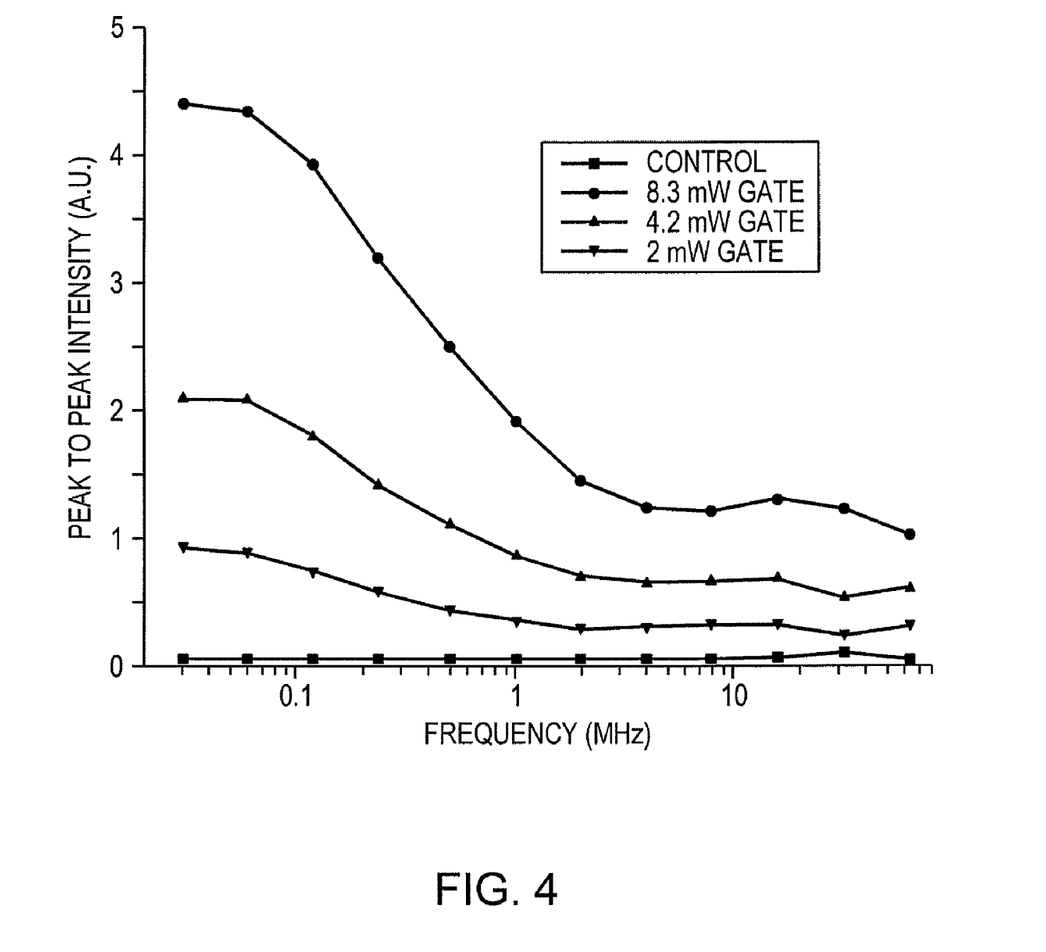
FIG. 4 is a graphical representation of the frequency dependant device response at speeds up to approximately 50 MHz, according to principles of the invention.

The frequency of the sinusoidal gate modulation was varied, and further data was taken to determine the bandwidth of the all-optical modulation mechanism. As before, a lock-in amplifier was used along with a filter to isolate the signal optical mode on the device output. As shown in FIG. 4, data were taken at speeds from 30 KHz to 50 MHz. The device response was fairly flat from 1 to 50 MHz. The peak to peak intensity modulation measured on the output gate mode is shown as a function of gate modulation frequency, for a constant gate power. We surmise that the higher response at slower speeds is likely due to heating.

Figure 5:
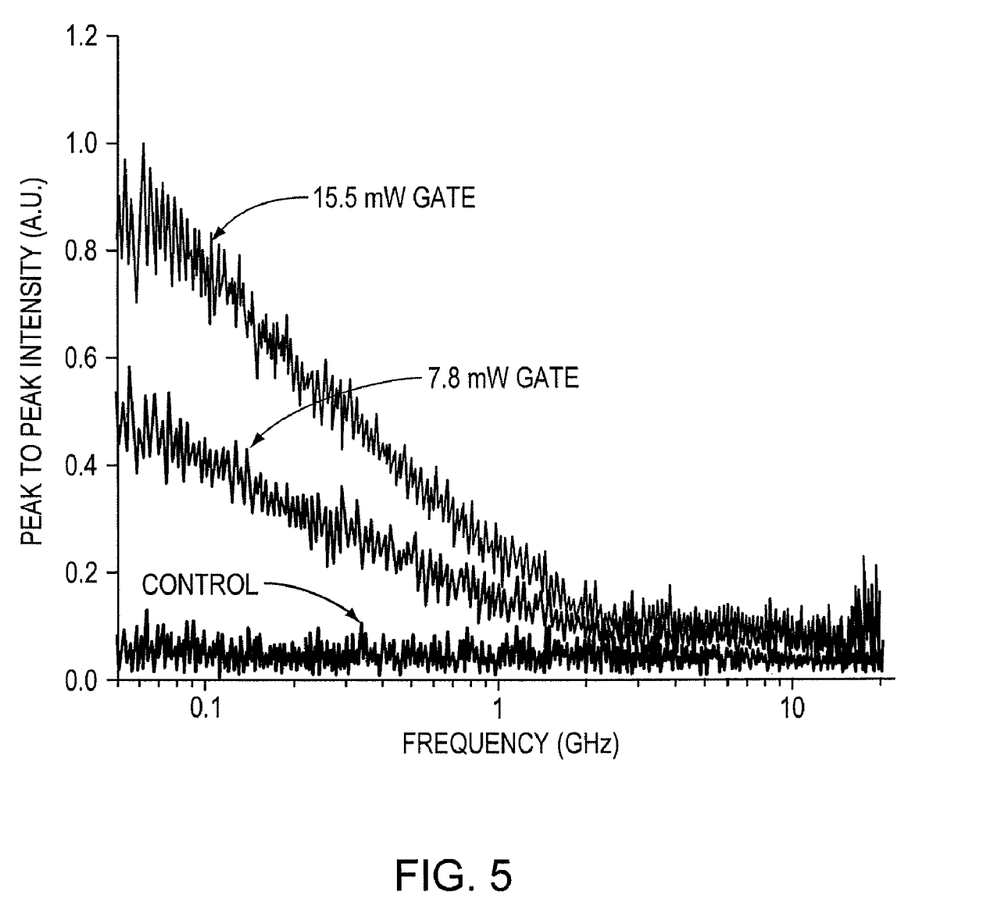
FIG. 5 is a graphical diagram illustrating the high speed frequency response of a single photon absorption modulator device, according to principles of the invention.

Higher speed data were taken by means of a lightwave component analyzer (LCA). In this case, an Agilent 8703B (available from Agilent Technologies, Inc, 5301 Stevens Creek Blvd, Santa Clara Calif. 95051) was used. As before a spectral filter was used to remove the gate mode from the output of the device, ensuring that the LCA measured only the intensity modulation due to the all-optical modulation effect. FIG. 5 shows the results that were obtained. There is clearly a substantial falloff in the device response as the modulation speed approaches 1 GHz. As will be discussed shortly, this is evidence of free-carrier mediation.

FIG. 5 is a graphical diagram illustrating the high speed frequency response of a single photon absorption modulator device. As before, the peak to peak intensity modulation measured on the output gate mode is shown as a function of gate modulation frequency, for a constant gate power. A control is shown in which the signal power was set to zero and the gate to around 15.5 mW, confirming that the gate mode has been filtered out fully.

Testing with a Pulse Stream

To measure the polarity of the mechanism, as well as to observe the performance at slightly higher levels of gate power, measurements were performed in which the gate was pulsed at a repetition rate of 30 MHz and a pulse width of 8 ns. The wavelength was chosen to utilize the arm length difference to bias the Mach-Zehnder offset θ as it appears in Eqn. (1) in the theoretical discussion section. It was found that the polarity of the phase shift was negative; that is, $\partial\phi/\partial P_{gate}$ is negative. Device response of approximately −0.9 degree/mW was observed at a peak gate power of 33.5 mW, for a total phase shift of −30 degrees. A negative index shift is consistent with the effects free carriers, but not the Kerr effect or heating. Details are shown in FIG. 6.

Figure 6:
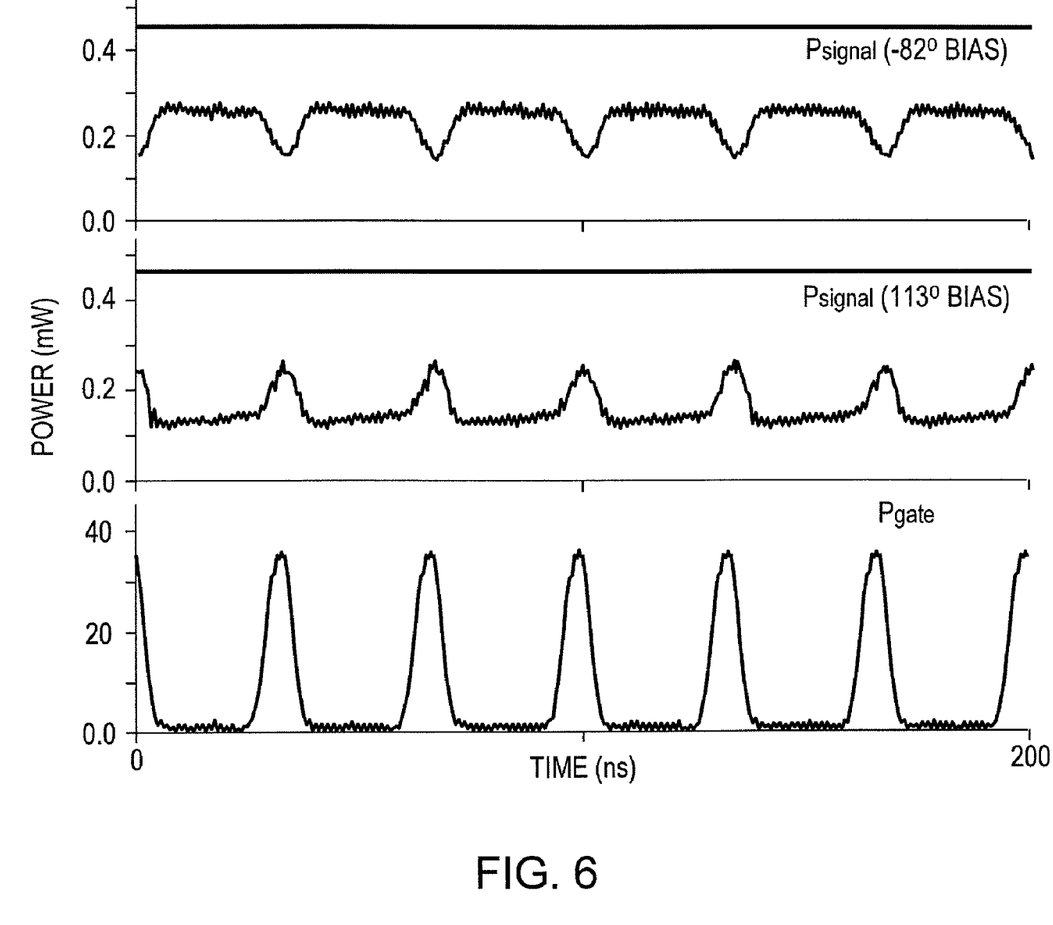
FIG. 6 is a diagram illustrating in graphical form the results of pulsed measurements observed using a single photon absorption modulator, according to principles of the invention.

FIG. 6 is a diagram illustrating in graphical form the results of pulsed measurements observed using a single photon absorption modulator. The projected time domain trace of the gate power is shown in the lowermost curve. The data has been normalized so that the known insertion loss due to the grating couplers has been removed. As a result, the power shown in the upper two traces is the propagating power in the modulation waveguide. The output signal powers are shown for two different bias points, giving two different angular bias points of −82 degrees (uppermost curve) and 113 degrees (middle curve), respectively. In this case, the power reported is the projected power in the silicon waveguide past the final Mach-Zehnder y-junction.

Calculation of Waveguide Surface to Volume Ratio

We have indicated that the devices fabricated in silicon described herein use surface-state absorption involving defects in the surfaces of the waveguide. There are other possible mechanisms for causing single-photon absorption to occur, including damage to the volume of the silicon waveguide, for example by implanting ions in the silicon. Therefore, it is reasonable to consider the surface to volume ratio of waveguides as described herein, in order to evaluate which waveguides might be better suited to operate in the single-photon absorption mode using surface defects. In order to calculate the relative surface to volume ratios of various configurations of waveguides, we will take a 1 micron length of the waveguide as a unit of length, because the other dimensions that we consider are given in microns as well. The surface area of the 1 µm length of waveguide is computed as the sum of the products of the 1 µm length multiplied by each of the surface dimensions (top width, bottom width, and each of the side depths or thicknesses), all measured in units of microns. The volume of the 1 µm length of the waveguide is the product of the 1 µm length times the waveguide width times the waveguide depth (or thickness), all measured in units of microns. Table 1 lists several prior art wave guide dimensions as well as the dimensions used in an embodiment of a single photon absorption device described herein. The waveguide cross sections are taken to be rectangular. As may be seen from Table 1, the surface to volume ratio for the waveguides we describe is substantially greater than either of the surface to volume ratios of the prior art waveguides of others. This is a consequence of the smaller dimensions we use for the waveguides described herein, as compared to the prior art waveguides. The surface to volume ratio we used in this work is computed to be 24 $\mu m^{-1}$. The results in Table 1 suggest that a surface to volume ratio is the range of 18 $\mu m^{-1}$ or more would appear to be useful in providing silicon waveguide-based systems that exhibit single photon absorption. We expect that surface to volume ratios of 19 $\mu m^{-1}$, 20 $\mu m^{-1}$, 21 $\mu m^{-1}$, 22 $\mu m^{-1}$, and 23 $\mu m^{-1}$ would also be effective. Various waveguide dimensions, as shown in Table 1 as hypothesized examples, can provide such surface to volume ratios. Based on this analysis, we expect that waveguides of even smaller dimensions will have still larger surface to volume ratios that 24 $\mu m^{-1}$, and should be expected to exhibit single photon absorption behavior as well. This analysis does not take into consideration that oxides are known to passivate surface defects in silicon, and therefore, the surface of the waveguide contacting the silicon oxide layer might be omitted in other calculations.

and/or ground potential are commonly used, optical systems can use optical signals having predefined characteristics, such as defined frequency and intensity (or power), as reference signals. As will be appreciated, all components that require electrical power to operate (e.g., laser sources, electrical signal generators, an electrical detector or analyzer configured to receive the output of a photodetector, and so forth) can be powered using conventional power supplies, which draw power from conventional electrical power distribution systems (e.g., wall sockets), or from portable electric power supplies, such as batteries. While the structure described herein is a Mach-Zehnder configuration, other configurations for modulators using waveguides are also known, and it is expected that such other configurations may be equally useful in constructing optical modulators that operate in the single-photon absorption regime. Examples of other configurations include ring resonators and photonic crystal or periodic Bragg-grating-based waveguide structures. Optical resonator configurations such as these have the potential to enhance the device response to a given number of single-photon absorption-generated free carriers.

The lack of a low power optical switch, the optical equivalent of a transistor, is one reason that an all-optical computer has not yet been developed. One might consider building an

TABLE 1

| Reference | Length (μm) | Width (μm) | Depth (μm) | Surface Area (μm)$^2$ | Volume (μm)$^3$ | Surface/Volume Ratio (μm)$^{-1}$ |
|---|---|---|---|---|---|---|
| Prior art | 1 | 2 | 0.9 | 5.8 | 1.8 | 3.222222 |
| Prior art | 1 | 0.45 | 0.25 | 1.4 | 0.1125 | 12.44444 |
| This work | 1 | 0.5 | 0.1 | 1.2 | 0.05 | 24 |
| This work - hypothesis | 1 | 1 | 0.125 | 2.25 | 0.125 | 18 |
| This work - hypothesis | 1 | 0.6 | 0.125 | 1.45 | 0.075 | 19.33333 |
| This work - hypothesis | 1 | 0.5 | 0.125 | 1.25 | 0.0625 | 20 |
| This work - hypothesis | 1 | 0.5 | 0.11 | 1.22 | 0.055 | 22.18182 |
| This work - hypothesis | 1 | 0.1 | 0.1 | 0.4 | 0.01 | 40 |

Construction of an Operational Device

We will now describe how an operational device, such as a single "optical transistor," can be constructed. Using the devices described with regard to FIG. 2 as a starting point, one can substitute a digital signal generator, such as an electrical digital signal generator, for the electrical pseudorandom binary sequence generator, so that the signal applied to the gate is a signal having a desired value. One can apply an optical signal to be modulated as an input signal to the input port of the device using a laser with an amplifier such an EDFA as may be required. One can detect the output at the output gate using a filter as may be required or desired, and using a photodetector that provides an electrical signal representative of the optical output signal. In building a more complex device, such as a logic gate, a memory element, or other optical signal processing circuitry, one can cascade more than one device, using the output signal of one device as the input to a gate on another device, or using the output signal of one device as an input (possibly in combination with the output from a second device) as input to the input port of another device. Circuits can be constructed by analogy to known digital or analog circuit designs that use electrical transistors as elements, and which operate using similar logical rules and procedures. By analogy to electrical circuits, in which reference voltages such as various supply voltages optical computation device using a plurality of single-photon absorption based switches. One approach would be to use the single-photon absorption switch to construct the optical equivalent of a flip-flop; that is, a device that has two stable states, which can encode a 1 or a 0. Another possibility is to use single-photon absorption switching regions on two arms of a Mach-Zehnder interferometer, which could be used to construct an AND gate. Because these elements would be relatively low in power for a well-designed single-photon absorption switch, it is expected that one could construct many of them in close proximity, allowing the creation of extremely fast and powerful computation engines.

In general, a logic gate or logic element built using the single-photon absorption based methods described would implement a logic function as follows. One would define a state of the input optical signal and a state of the gate signal. The modulator configured to implement the desired logic function would provide at its output an optical signal that represents the desired logic function as a state of the output signal relative to the state of said input signal. For example, an inverter would provide an output signal having the inverted value of the input signal (e.g., input is "0" or "low" or "false", output is "1" or "high" or "true"). As mentioned, using two input gates, one in each arm of a balanced Mach-Zehnder, might be used to sum two signal, or with the addition of an inverter, or of a gate that introduces a 180 degree modulation, to obtain the difference between two signals.

Distinguishing Single-Photon Absorption (SPA) Based Devices from Two-Photon Absorption (TPA) Devices It is expected that it will be possible to distinguish by observation whether a device is based on a single-photon absorption or two-photon absorption mechanism, for example based on the device response to the gate optical mode strength. A device based on a single-photon absorption mechanism will be expected to continue to have a linear response to the gate optical mode strength, while the response from the two-photon absorption device will be quadratic. By way of example, consider the small-signal response for a device that is characterized in terms of 10 degrees of response for a certain amount of gate power. If the power is now reduced by a factor of 100, a single-photon absorption based device will now have a response of 0.1 degrees, but a two-photon absorption based device will now have a response of 0.001 degrees. As a practical matter, this means that for smaller powers the single-photon absorption device will continue to function, but at a certain point the two-photon absorption device will practically cease to respond to the gate optical mode. At very high powers, for particularly efficient devices, another data point can be used. The two-photon absorption based device will always have a quantum efficiency in terms of switching electrons and holes that is around one-half that of the single-photon absorption based device. While gain due to avalanche processes or some other intermediate step may obscure this somewhat, it should still be possible to determine which mechanism is operative based on the operational limitations and/or response as a function of input power on device performance.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Evidence of Single-Photon Absorption Mechanism

There are a number of possible mechanisms by which one near-infrared optical mode can induce a phase shift in a second near-infrared optical mode in a silicon waveguide. These consist of thermal interaction, the Kerr effect, or free-carrier dispersion, which can be due to two-photon absorption, or in the case of our all-optical modulator, single-photon absorption. Whatever the mechanism, it is possible to express the all-optical interaction as follows:

$$P_{out}=C(1+\cos(\gamma((1+b\cos(\omega t))P_{gate})^{\alpha}+\theta))P_{signal}^{\beta}$$ Eqn. (1)

where we have assumed that the gate signal has the form $$(1+b\cos(\omega t))P_{gate}$$ Eqn. (2)

In Eqn. (1), $P_{out}$ is the output power as a function of time of the filtered signal optical mode, and $\gamma$ and C are proportionality constants characteristic of the interaction. We have also assumed the signal is at a speed far below the bandwidth limit of the relevant effect. If the modulator is biased at the point of maximal response, that is, choosing $\theta$ to be $\pm\pi/2$, then the peak to peak intensity modulation on the output will be proportional to $$R \propto 2\gamma b^{\alpha} P_{gate}^{\alpha} P_{signal}^{\beta}$$ Eqn. (3)

if the modulation effect produces much less than $\pi/2$ radians of phase shift. In all of the experiments described herein, except where explicitly noted otherwise, the modulator bias was always set to this value. It was easy to do this, because far less than $\pi/2$ radians of shift was achieved in even the highest gate power cases, and so this amounted to simply tuning the signal wavelength to maximize the device response. In the case of a linear modulation mechanism, that is, where $\alpha$ and $\beta$ are both 1, $\gamma$ can be identified as $\partial\phi/\partial P_{gate}$.

Other than single photon absorption, the mechanisms that exhibit this power law are two photon absorption-based absorption modulation, the Kerr effect, and Raman scattering. In all three cases, however, there exists no bandwidth limitation near 1 GHz. Of these effects, a phase shift would be observed for only the Kerr effect. Moreover, Raman scattering must involve wavelengths separated by the Raman shift— 15.6 THz in silicon—which is clearly irrelevant to the current result. As shown in table I, the observed gate response is also more than an order of magnitude larger than what would be achievable with any mechanism other than single photon absorption, even in an idealized case. Single-photon absorption is the only mechanism consistent with the observed data.

The lower gate responses of other modulation mechanisms result in typical effective $P_{\pi}$ values from 5 Watts, to 100 Watts. The high modulation power requires most other devices to be operated in pulsed mode. Even when resonant enhancement is used to greatly lower the external power required, the internal circulating power must still be quite high. By contrast, our single photon absorption based device can be projected to achieve complete extinction at around 180 mW $P_{\pi}$, over an order of magnitude lower than is achieved with existing mechanisms. No further resonant enhancement would be required. Furthermore, silicon nano-waveguides can carry bit streams with average power levels in the tens and hundreds of milli-Watts. However, multi-Watt average power levels will rapidly damage the guides.

Table 2 provides a list of all-optical modulation mechanisms in silicon waveguides. For each mechanism, the two exponents from Eqn. (3) are shown. For phase modulation mechanisms, the theoretical gate response for the silicon ridge waveguide studied is given, for powers near 5 mW. Also shown is the response achieved in an actual realization. The device response for single-photon absorption, representing the devices described herein, is for a 1.2 cm Mach-Zehnder modulator, with gate power near 5 mW. In writing the exponents, we have assumed that the shift in refractive index is linearly proportional to the number of free carriers, which is approximately valid in the relevant optical power regime. We have also assumed that the bandwidth of the single photon absorption mechanism is limited by the free-carrier lifetime. The discrepancy between the theoretical and observed performance is due in part to the larger waveguides used in typical realizations, compared to the 0.5×0.1 μm ridge used here, as well as effective lengths that may be less than 1.2 cm. Since carrier injection from TPA (II) is not linear in the input signal, it is impossible to quantify a comparable gate response. The estimate of the single-photon absorption modulator's theoretically best performance assumes that an electron and hole are created with each absorbed photon. One of the works referred to (Q. Xu, and M. Lipson) utilizes resonant enhancement. For clarity of comparison, the projected performance in a non-resonant Mach-Zehnder modulator is shown. Note that the achieved performance in our device exceeds the theoretical limit for the Kerr effect as well as carrier-injected TPA (I).

TABLE 2

ALL-OPTICAL MODULATION MECHANISMS IN SILICON WAVEGUIDES

| Effect | α | β | Bandwidth | Theoretical maximum gate response near 5 mW (degrees/mW) | Typical effective gate response near 5 mW (degrees/mW) |
|---|---|---|---|---|---|
| Electro-optic Modulation | N/A | 1 | Free carrier limited | N/A | N/A |
| Carrier injection from TPA (I) | 2 | 1 | Free carrier limited | 0.1 | $7 \times 10^{-5}$ [*] |
| Carrier injection from TPA (II) | 1 | 2 | Free carrier limited | N/A | N/A |
| TPA based absorption | 1 | 1 | Ultrafast | N/A | N/A |
| Kerr Effect | 1 | 1 | Ultrafast | 0.14 | 0.0018 [**] |
| Stimulated Raman Scattering | 1 | 1 | Raman gain bandwidth, 100 GHz | N/A | N/A |
| Single-photon absorption (This work) | 1 | 1 | Apparently free carrier limited | 32 | 1 |

[*] Q. Xu, and M. Lipson, "All-optical logic based on silicon micro-ring resonators," Optics Express, vol. 15, pp. 924-929, 2007.

[**] Ö. Boyraz, P. Koonath, V. Raghunathan, and B. Jalali, "All optical switching and continuum generation in silicon waveguides," Optics Express, vol. 12, pp. 4094-4102, 2004.

Free-Carrier Model of Modulation Effect

If the hypothetical model of the creation of both an electron and hole is used, the shift in electron-hole concentration can be written as:

$$\Delta N = \tau \frac{\sigma}{A} P \quad \text{Eqn. (4)}$$

Here P is the gate power, and A is the waveguide area. We introduce σ, the absorption density, which determines the number of photons absorbed per unit length in the waveguide for a given amount of power. The absorption density has units of $cm^{-1}s^{-1}mW^{-1}$. The parasitic loss from absorption will be:

$$\alpha = h\nu\sigma \quad \text{Eqn. (5)}$$

where h is Planck's constant, and ν is the relevant photon frequency, around 193 THz.

We could then express the device response using the following free-carrier dispersion relations $$\frac{\partial \phi}{\partial P_{gate}} = -\frac{\partial}{\partial P_{gate}} \int_0^L dz \left( \frac{\left(P_{gate}\exp(-\alpha z)\frac{\tau\sigma}{A} + p_0\right)^{.8} 8.5 \times 10^{-18} +}{\left(P_{gate}\exp(-\alpha z)\frac{\tau\sigma}{A} + n_0\right) 8.8 \times 10^{-22}} \right) \frac{\partial n_{eff}}{\partial n_{bulk}} * k_0 \quad \text{Eqn. (6)}$$

A similar expression would be used if only a free hole were created, and would in fact provide comparable results, since free holes have a larger influence on the induced refractive index shift. Here, A is the waveguide area, $p_0$ and $n_0$ are equilibrium hole and electron concentrations, $P_{gate}$ is the gate power, τ the recombination lifetime, σ is the absorption density, and α is the optical attenuation coefficient. Eqn. (6) will be nearly linear in the regime for which data were taken.

Eqn. (6) implicitly assumes that the operation speed is much lower then the bandwidth limitation. As is shown below, as the operation speed approaches the recombination lifetime, the device response in the form of peak-to-peak intensity of the modulated signal has the following behavior:

$$R \propto \frac{1}{\sqrt{1 + (\omega\tau)^2}} \quad \text{Eqn. (7)}$$

where ω is the excitation frequency, and τ is the minority-carrier lifetime. As a result of Eqn. (1), the device response will have a 70% reduction at around f=½τ. This occurs near 1 GHz, suggesting a minority carrier lifetime of around 0.5 ns, similar to values reported for similar SOI ridge waveguides. This provides further evidence that the modulation effect is free-carrier mediated.

Calculating Surface-State Absorption Density

Eqn. (6) can be solved for the observed phase shift once the recombination lifetime is known. In the case of the highest performing device, which achieved around 16.6 degrees for 15.5 mW of gate power, the absorption density can be calculated as $1.4 \times 10^{14}$ $cm^{-1}s^{-1}mW^{-1}$. This implies a waveguide loss due to the single photon absorption mechanism of only 0.1 dB/cm, which is a small fraction of the waveguide loss seen. Typical excess carrier concentrations under testing conditions with this density are on the order of $7 \times 10^{14}$ $cm^{-3}$ for 5 mW of gate power.

Geis et al. measured the absorption density directly through a photocurrent measurement. A responsivity of 0.8 A/W was demonstrated in a 0.25 mm device, corresponding to a quantum efficiency of 64%. That implies the optical loss due solely to absorption would be at least 178 dB/cm, and from Eqn. (3) the absorption density can be estimated as $3.1 \times 10^{17}$ $cm^{-1}s^{-1}mW^{-1}$.

Ultimate Performance Limitations

A complete explanation of the single photon absorption mechanism likely will require further work will be required to understand the single-photon absorption mechanism. One possibility is that an electron is excited into the conduction band from the valence band. In another possibility, the electron is knocked into a defect state, creating a free hole. As holes have a disproportionately large effect on the refractive index shift in silicon, the creation of a free hole would adequately explain the observed behavior.

Figure 7:
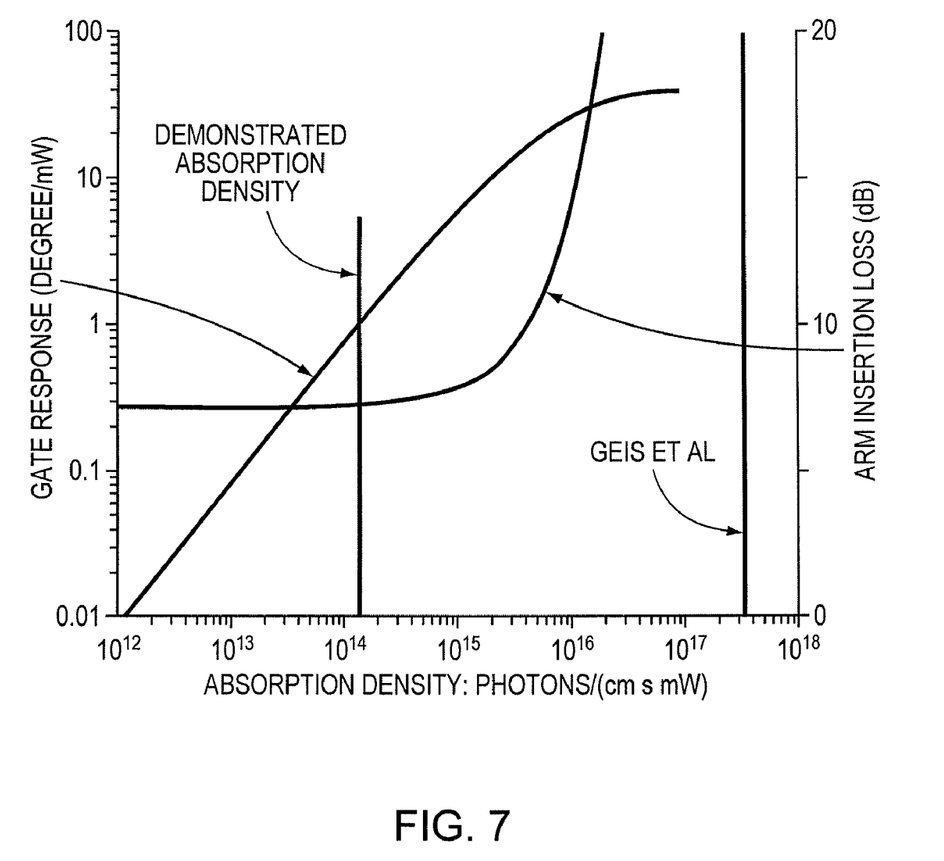
FIG. 7 is a diagram that illustrates projected performance of single photon absorption devices for varying surface-state absorption densities, according to principles of the invention.

We can estimate the ultimate performance limits if we hypothesize that both an electron and hole are created for each absorbed photon. The free-carrier lifetime would determine the ultimate modulation speed. Approaches have been developed to lower this lifetime and frequencies exceeding 5 GBit/sec should be possible. It is also possible to decrease the gate power required for modulation by increasing the density of photon-absorption centers, at the expense of insertion loss. We estimate that, allowing 6 dB of additional loss from implantation-generated defect centers, a gate response of 32 degree/mW could be achieved at 0.5 GBit/sec, corresponding to a $P_\pi$ around 6 mW; this would require around a factor of 100 increase in absorption density over the value currently obtained in our devices. Absorption center densities as much as three orders of magnitude higher than those in this work have been previously engineered, suggesting that these improvements are likely to be possible. FIG. 7 shows a graph of projected performance values for varying absorption densities.

FIG. 7 is a diagram that illustrates projected performance of single photon absorption devices for varying surface-state absorption densities. A response of nearly 32 degree/mW could be obtained for absorption densities a factor of 100 higher than the projected value in our device.

Derivation of Bandwidth Limit for Device

The response of the Mach-Zehnder near the 3 dB bias point of the modulator is proportional to the phase shift induced by the gate signal. This in turn is nearly proportional to the free-carrier density. As a result, the frequency response can be calculated based on the time-dependant equation for the excess carrier concentration:

$$\frac{dN}{dt} = G - \frac{N}{\tau} \quad \text{Eqn. (8)}$$

where G is the generation rate in $cm^{-3}s^{-1}$. Under the experimental conditions of a gate with a sinusoidal intensity modulation, G(t) will have the form $G_0(1+b \cos(wt))$. The solution for N in this case is:

$$N(t) = G_0\tau\left(1 + \text{Re}\left(\frac{\exp(i\omega t)}{1 + i\omega\tau}\right)\right) \quad \text{Eqn. (9)}$$

Since the responsivity is proportional to the AC amplitude of N(t), it will have a frequency dependence of $(1+(\omega\tau)^2)^{-1/2}$.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. An optical modulator configured to operate in a single-photon absorption mode, comprising:
 a ridge waveguide having an input port, an output port and a gate port, said ridge waveguide having an absorption density of less than $10^{17}$ $cm^{-1}s^{-1}$ $mW^{-1}$, said ridge waveguide configured to operate in a single-photon absorption mode;
 said input port of said ridge waveguide configured to receive an input optical signal to be modulated;
 said gate port of said ridge waveguide configured to receive a gate signal representing a desired modulation to be applied to said input optical signal; and
 said output port of said ridge waveguide configured to provide as output an output signal representing said input signal modulated using said gate signal.

2. The optical modulator of claim 1, wherein said ridge waveguide has an absorption density of less than $10^{16}$ $cm^{-1}s^{-1}mW^{-1}$.

3. The optical modulator of claim 1, wherein said ridge waveguide has an absorption density of less than $10^{15}$ $cm^{-1}s^{-1}mW^{-1}$.

4. The optical modulator of claim 1, wherein said ridge waveguide comprises a Mach-Zehnder interferometer.

5. The optical modulator of claim 1, wherein said ridge waveguide comprises a semiconductor material.

6. The optical modulator of claim 5, wherein said semiconductor material is silicon.

7. An optical logic element, comprising:
 an optical modulator according to claim 1;
 an optical source configured to provide an input optical signal to said input port of said ridge waveguide;
 an optical source configured to provide at said gate port of said ridge waveguide a gate signal representing a desired modulation to be applied to said input optical signal; and
 a detector configured to detect an output signal provided as output at said output port of said ridge waveguide;
 said logic element configured to implement a logic function based on a state of said input optical signal and a state of said gate signal, said logic function represented by a state of said output signal relative to said state of said input signal.

8. A method of operating an optical modulator in a single-photon absorption mode, comprising the steps of:
 providing a ridge waveguide having an input port, an output port and a gate port, said ridge waveguide having an absorption density of less than $10^{17}$ $cm^{-1}s^{-1}mW^{-1}$, said ridge waveguide configured to operate in a single-photon absorption mode;
 said input port of said ridge waveguide configured to receive an input optical signal to be modulated;
 said gate port of said ridge waveguide configured to receive a gate signal representing a desired modulation to be applied to said input optical signal; and
 said output port of said ridge waveguide configured to provide as output an output signal representing said input signal modulated using said gate signal;
 applying to said input port of said ridge waveguide an input optical signal;
 applying to said gate port of said ridge waveguide a gate signal representing a desired modulation to be applied to said input optical signal; and
 detecting at said output port of said ridge waveguide an output signal representing said input signal modulated using said gate signal;
 whereby said input signal is modulated by said optical modulator.

9. The method of operating an optical modulator of claim 8, wherein said ridge waveguide comprises a Mach-Zehnder interferometer.

10. The method of operating an optical modulator of claim 8, wherein said ridge waveguide comprises a semiconductor material.

11. The method of operating an optical modulator of claim 10, wherein said semiconductor material is silicon.

* * * * *